United States Patent [19]

Schilling

[11] Patent Number: 5,606,279
[45] Date of Patent: Feb. 25, 1997

[54] APPARATUS FOR PRODUCING A DIGITAL INPUT TO A RECORDING STATION

[75] Inventor: Robert Schilling, Niederrohrdorf, Switzerland

[73] Assignee: ABB Management AG, Baden, Switzerland

[21] Appl. No.: 589,157

[22] Filed: Jan. 22, 1996

Related U.S. Application Data

[63] Continuation of Ser. No. 324,961, Oct. 18, 1994, abandoned.

[30] Foreign Application Priority Data

Dec. 1, 1993 [EP] European Pat. Off. .............. 93119342

[51] Int. Cl.⁶ ...................................................... H03L 5/00
[52] U.S. Cl. ............................ 327/333; 327/20; 327/603; 361/88; 361/93
[58] Field of Search ................................... 327/333, 306, 327/309, 319, 1, 18, 20; 361/73, 75, 78, 96, 603, 605, 88, 93

[56] References Cited

U.S. PATENT DOCUMENTS

| | | | |
|---|---|---|---|
| 3,697,819 | 10/1972 | Eichelberger et al. | 317/103 |
| 3,742,371 | 6/1973 | Seibt et al. | 363/18 |
| 3,868,665 | 2/1975 | Treglown | 340/255 |
| 4,148,088 | 4/1979 | Meroni | 361/93 |
| 4,467,220 | 8/1984 | Page | 307/19 |
| 4,688,143 | 8/1987 | Beard | 361/335 |
| 4,912,591 | 3/1990 | LeCourt | 361/75 |
| 4,931,896 | 6/1990 | LeCourt | 361/73 |
| 5,040,996 | 8/1991 | Kobold et al. | 439/76 |
| 5,258,654 | 11/1993 | Roberts et al. | 307/125 |
| 5,414,344 | 5/1995 | Chinn | 324/72 |

FOREIGN PATENT DOCUMENTS

| | | |
|---|---|---|
| 0101643 | 2/1984 | European Pat. Off. . |
| 0240434 | 10/1987 | European Pat. Off. . |
| 0350624 | 6/1989 | European Pat. Off. . |
| 2666901 | 3/1992 | France . |
| 59-58916 | 4/1984 | Japan . |

OTHER PUBLICATIONS

"Datentechnik Data Systems", Modulfamilie ED 1000, BBC Aktiengesellschaft, 1983.
Indactic 65C Storschreiber [fault recorder] Betriebsvorschrift Erfassungsstation [operating instructions for recording station] HEDT 92730, 9105 from ABB Process Automation AG, Baden/Switzerland, 2nd Edition 1991.

*Primary Examiner*—Timothy P. Callahan
*Assistant Examiner*—Kenneth B. Wells
*Attorney, Agent, or Firm*—Burns, Doane, Swecker & Mathis, L.L.P.

[57] ABSTRACT

A digital input is disclosed for supplying a digital signal representing the occurrence of a special event, such as a malfunction, to a recording device. The present invention can be advantageously used in a distribution network for electrical energy, in which the special event triggers the actuation of a switch in a switchgear. The digital input has two first current terminals, to which direct current is applied from an external voltage source. Two second current terminals are connected to a sensor element, for example an auxiliary contact of the switchgear, which outputs the digital signal when the special event occurs. An electrical circuit is also connected to the two second current terminals and carries the digital signal to an optocoupler which provides electrical isolation. The digital input furthermore has a device for converting the direct current supplied from outside the device into a direct current which is electrically isolated therefrom. The device is operatively connected to the two first current terminals on the input side and to the signal circuit on the output side. In contrast to digital inputs according to the prior art, only signal currents are supplied via the two second current terminals. For this reason, only very simple protective measures against electrical and electromagnetic noise levels must be taken at the current terminals.

17 Claims, 3 Drawing Sheets

5,606,279

APPARATUS FOR PRODUCING A DIGITAL INPUT TO A RECORDING STATION

This application is a continuation of application Ser. No. 08/324,961, filed Oct. 18, 1994.

BACKGROUND OF THE INVENTION

Field of the Invention

The invention proceeds from a digital input for a device for recording a digital signal when a special event occurs in a process, in particular in the event of a malfunction in a distribution network for electrical energy, having at least four current terminals, to the first two of which direct current is applied from an external voltage source, and the second two of which are connected to a sensor element which outputs the digital signal when the special event occurs, and having an electric circuit which is connected to the two second current terminals and carries the digital signal to an electrical isolating point.

Discussion of Background

The invention makes reference here to a prior art as is known, for example, from Indactic 65C Störschreiber [fault recorder] Betriebsvorschrift Erfassungsstation [operating instructions for recording station] HEDT 92730, 9105 from ABB Process Automation AG, Baden/Switzerland, 2nd edition 1991. Inter alia, digital signals are also supplied to the recording station described in this prior art from a remotely executing process, for example the distribution of electrical energy in an electrical distribution network. Such digital signals are generated during the process by sensor elements which are designed, for example, in an electrical distribution network as auxiliary contacts of the switchgear provided in the distribution network. In the distribution network, the digital signals supply information as to whether the switchgear assigned to the signals is switched on or off. Each auxiliary contact functioning as a sensor element is connected to two current terminals of a digital input of the recording station. The digital input has conductor sections connected to the two current terminals as well as to two further current terminals, and also an optocoupler.

A battery which is provided outside the digital input in a system in which the process is executed and which typically exhibits 110 or 220 V direct current voltage is connected to the two further current terminals of the digital input. The battery, the auxiliary contact and the optocoupler are part of an electric circuit. When a special event occurs during the process, the auxiliary contact is closed and thereby forms the digital signal. The digital signal is a direct current flowing in the electric circuit supplied by the battery. The direct current is imaged by the optocoupler into a signal processing circuit electrically isolated from the battery circuit. To avoid unwanted electrical and electromagnetic noise levels in the digital input, it is necessary to provide filters at all four current terminals, which keep said noise levels away from the digital input. Since the full battery voltage is applied to the sensor element designed as an auxiliary contact, EMC filters which are adequately dimensioned for power supply units must be arranged not only at the current terminals connected to the battery, but also at those ones connected to the sensor element.

SUMMARY OF THE INVENTION

Accordingly, one object of the invention is to provide a novel digital input of the type mentioned at the beginning which has a particularly cost-effective electrical and electromagnetic shielding while being simple to construct.

The digital input according to the invention is distinguished from comparable digital inputs according to the prior art in that it requires comparatively complex protective devices only at the current terminals of the external voltage source, by means of which the unwanted electrical and electromagnetic noise levels are isolated from the digital input. In contrast, no supply voltage, but only a signal voltage is now applied to the current terminals for the sensor element. Signal lines and control lines can be protected against electrical and electromagnetic noise levels much more cost-effectively than supply voltage lines. For this reason, only EMC protection measures which can be implemented cost-effectively are required at these current terminals.

If a constant signal voltage and a voltage proportional to the input-side direct current voltage are generated in the digital input according to the invention, then even in the case of very different external voltage sources a single type of digital input is sufficient to always generate a digital signal reliably when the special event occurs. This is due to the fact that, as a result of the initially effective input-proportional voltage, the sensor element is activated and the digital signal is therefore formed. The digital signal formed can then be maintained with the comparatively low constant signal voltage. For this reason, the electrical losses with the digital input according to the invention are extremely small and in addition the planning and design work that was previously necessary is no longer required when producing new recording stations.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
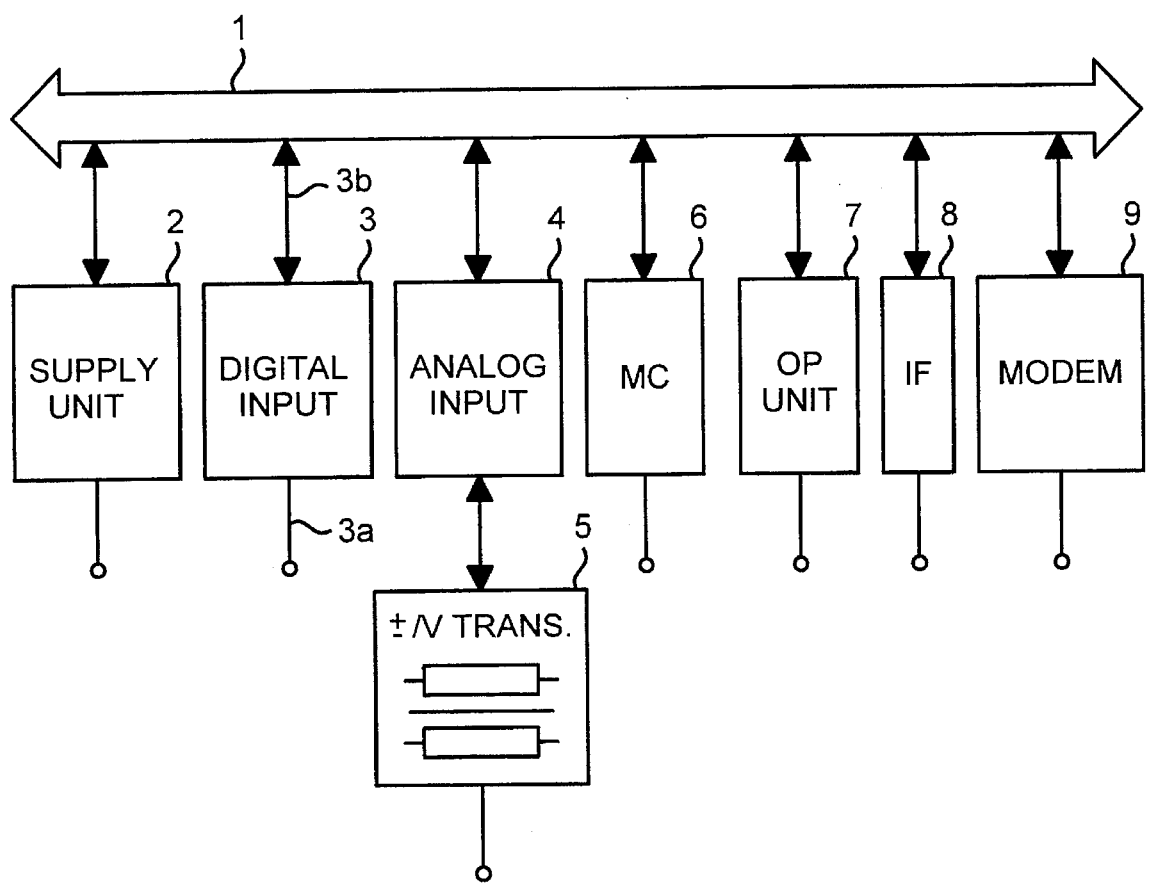
FIG. 1 shows a block circuit diagram of a recording station in which a digital input according to the invention is provided.

Referring now to the drawings, wherein like reference numerals designate identical or corresponding parts throughout the several views, the recording station illustrated in FIG. 1 is constructed from modules that communicate via a system bus 1. One of the modules serves as a supply unit 2. Said supply unit handles the electrical isolation from a supply source and generates the voltages required by the recording station. A further module serves as a digital input 3, having an input 3a and an output 3b. For example, 16 digital process signals can be applied in parallel to the digital input. Such process signals are, for example, the switch positions of the switchgear recorded by auxiliary contacts of the switchgear of a high-voltage switching station of an electrical energy distribution network. Said signals are continuously checked by the digital input 3 and stored if necessary.

Analog signals from the process are supplied to a module acting as an analog input 4 from analog sensors preferably designed as current or voltage transformers 5. Further modules are designed as microcomputer 6, operating unit 7, serial interface 8 and modem 9 and serve for-the control of the data traffic on the system bus 1, for the manual operation of the recording station, for the connection to a fault recorder and for communication on an external transmission line respectively.

Figure 2:
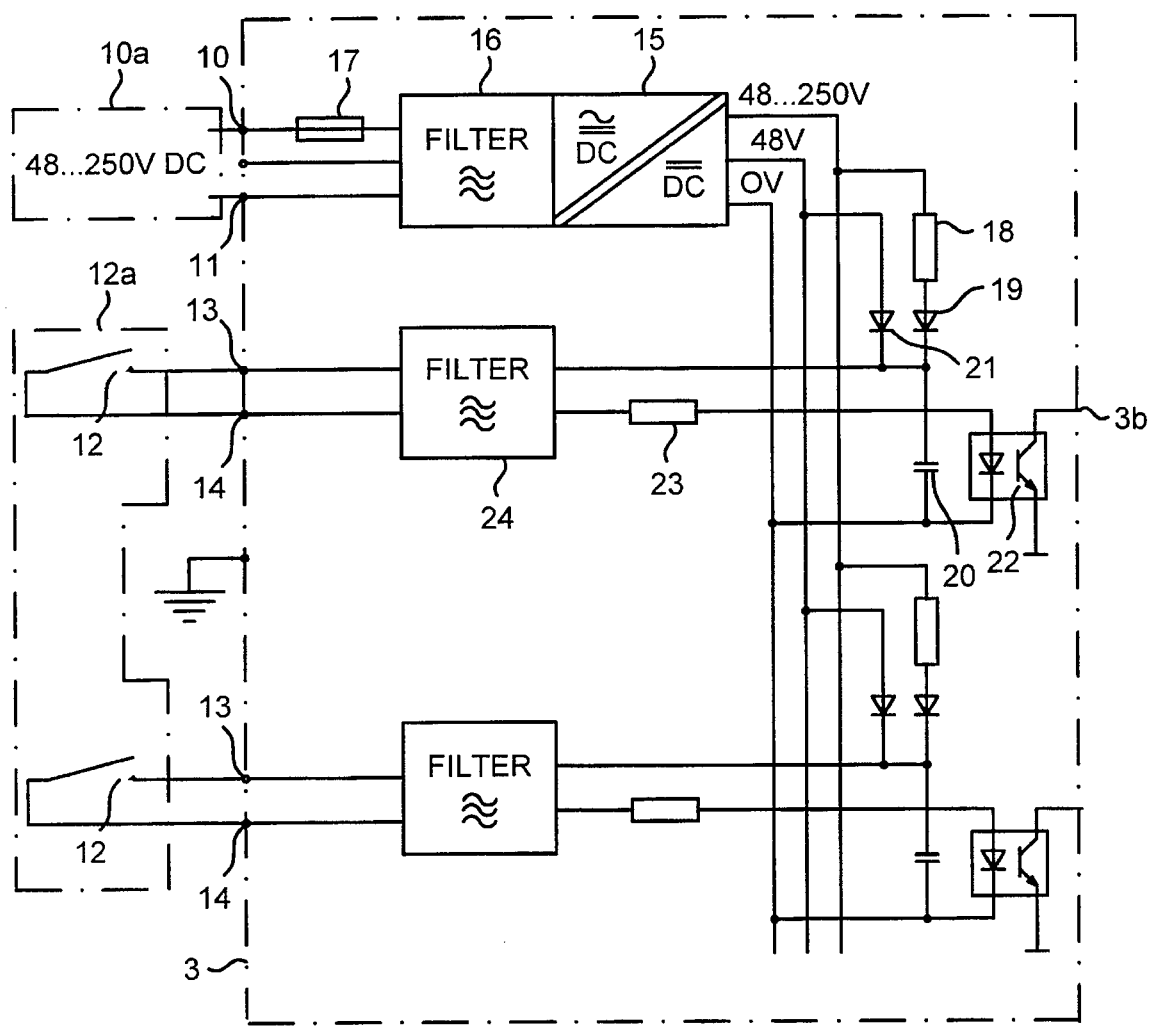
FIG. 2 shows a circuit diagram of the digital input that can be seen in FIG. 1.

The structure of the digital input 3 is illustrated in FIG. 2. It can be seen from this figure that the digital input 3 has a housing connected to ground or chassis potential and further includes two current terminals 10 and 11 designed as terminals. An external voltage source 10a is connected to the two current terminals 10, 11. Said voltage source is usually a battery having a direct current voltage of between 48 and 250 V. Said battery is located in a system, for example in a switching system of an energy distribution network or in a production system of an industrial plant, in which a process which is to be monitored for the occurrence of special events is executed. The system furthermore contains sensor elements, which are preferably designed as auxiliary contacts 12 of switchgear in a network generally represented as network 12a. Said auxiliary contacts 12 are connected in each case to two current terminals 13, 14 of the digital input 3. The voltage of the battery provided in the system is dimensioned in such a way that when the auxiliary contacts 12 close as a result of the occurrence of a special event, surface resistances produced by oxidation or impurities are removed and a reliable contacting is ensured. Depending on the design of the system bus 1, up to 8 or 16 sensor elements, for example, can be provided per digital input 3.

A device for converting the direct current supplied from the battery into direct current which is electrically isolated therefrom which is designed as a DC-DC converter or as a direct current converter 15 is provided in the digital input 3. A first input of said device is connected via a filter 16 and a fusible link 17 to the current terminal 10, while a second input on the other hand is connected only via the filter 16 to the current terminal 11. The filter 16 serves for the electromagnetic compatibility of the digital input 3 and filters out electrical and electromagnetic noise levels supplied to the digital input 3 via the external direct current voltage supply. The filter 16 is connected to ground in order to conduct the comparatively large interference currents filtered out during the voltage supply away from the digital input to ground. The fusible link serves to protect the direct current converter against overloading.

The direct current converter 15 has three outputs. A first of these three outputs carries a direct current voltage proportional to the input-side battery voltage, typically 48 to 250 V. A second of the three outputs carries a direct current voltage having a constant amplitude of typically 48 V, whereas the third output is held at zero potential (reference or return conductor). The first output of the direct current converter 15 is connected via a series circuit of a high-resistance resistor 18 and a diode 19 to a first current terminal of a capacitor 20. The second output of the direct current converter 15 is connected via a diode 21 likewise to the first current terminal of the capacitor 20. On the other hand, the third output of the direct current converter 15 is connected to the second current terminal of the capacitor and also to a first current terminal of a light-emitting diode provided in an optocoupler 22.

The second current terminal of the light-emitting diode of the optocoupler 22 is connected via an ohmic resistor 23 and a filter 24 to the current terminal 14. On the other hand, the first current terminal of the capacitor 20 is connected via the filter 24 to the current terminal 13. The filter 24 serves for the electromagnetic compatibility of the digital input 3 and filters out electrical and electromagnetic noise levels carried to the digital input 3 via the auxiliary contact 12. Since it is only necessary to filter out low electrical and electromagnetic noise levels in a signal line, the filter 24 can be realized extremely cost-effectively in comparison with the filter 16 and also in comparison with filters for digital inputs according to the prior art in which supply voltage is also carried in the signal lines. An electrical connection to ground is dispensed with since the filtered out interference currents are very low in comparison with the interference currents filtered out in the case of direct current voltage supply of the digital input 3.

The three outputs of the direct current converter 15 act analogously on the capacitors and opto-couplers, not shown in FIG. 2, of signal circuits assigned to different auxiliary contacts 12.

The digital input 3 according to the invention functions as follows: during normal execution of the process, the auxiliary contact 12 is passive, that is to say the auxiliary contact assigned to the sensor element is opened in accordance with FIG. 2. The capacitor 20 is charged to a voltage corresponding to the battery voltage via the high-resistance resistor 18 and the diode 19. The charging voltage of the capacitor 20 appears at the current terminals 13, 14.

Figure 3:
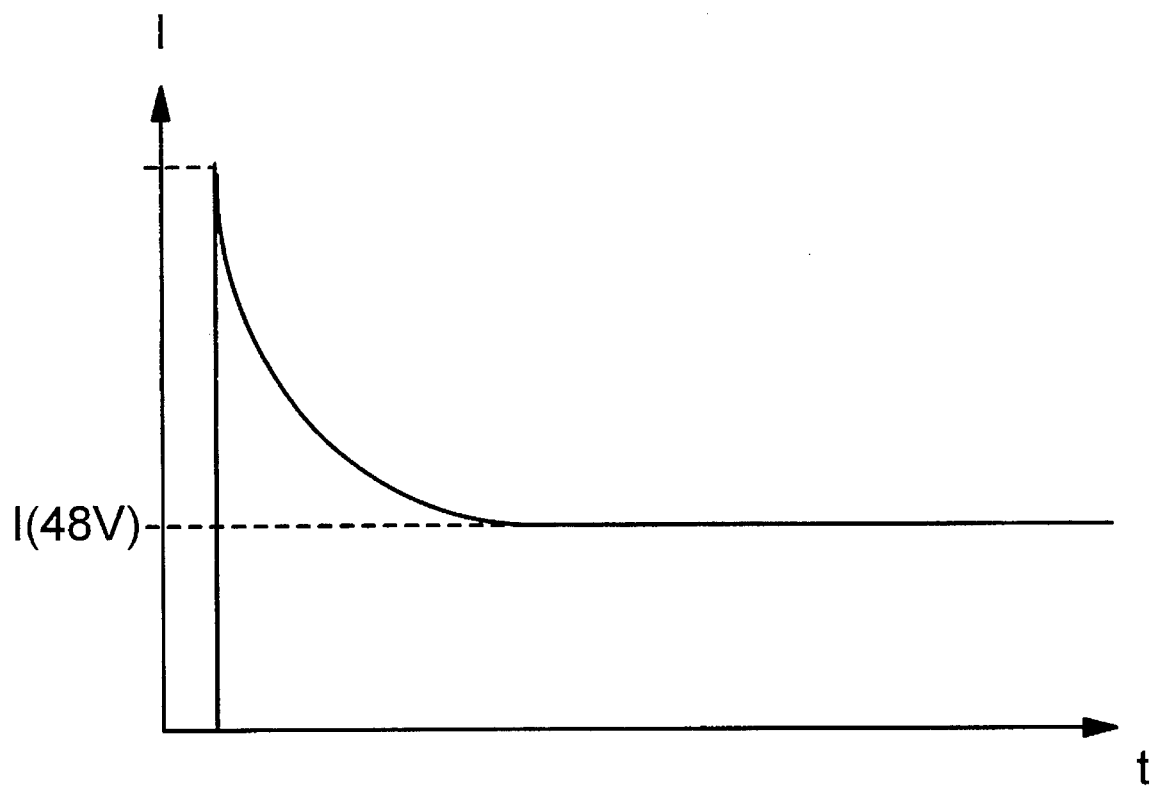
FIG. 3 shows a diagram in which the current I of a digital signal recorded by the digital input according to FIG. 2 is represented as a function of time t.

When the special event occurs, for example if switchgear provided in a switching system is actuated, the auxiliary contact is closed. In accordance with the diagram shown in FIG. 3, the capacitor 20 is now discharged via the auxiliary contact 12, the resistor 23 and the light-emitting diode of the optocoupler 22 initially with a pulse-like starting current inrush, the initial voltage of which is determined to begin with by the magnitude of the input-voltage-proportional direct current voltage. This current inrush removes any oxide and dirt layers on the auxiliary contact and thus enables a reliable contacting at low voltage values. The capacitor 20 should be dimensioned in such a way that said current inrush is sufficient to achieve the effect described above. Following that, the signal current now supplied exclusively from the second output of the direct current converter 15 is converted into a direct current of 48 V. This direct current forms a digital signal which is imaged electrically isolated via the optocoupler 22 and imaged into an electric circuit acting on the system bus 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A digital input comprising:

at least four current terminals, a first two of the current terminals being applied with direct current from an external voltage source, and a second two of the current terminals being connected to an auxiliary contact which outputs a digital signal when a special event occurs;

an electric circuit which is connected to the second two current terminals and which carries the digital signal to an electrical isolating point; and a device for convening the direct current applied from the external voltage source into a direct current which is electrically isolated therefrom, which converting device is operatively connected to the first two current terminals provided on an input side of the converting device and to the electric circuit on an output side of the converting device, wherein the direct current converting device has at least two outputs, a first one of which outputs an input-side proportional direct current voltage which is proportional to said external voltage source, and a second one of which outputs a direct current voltage having a constant amplitude, with the first and the second outputs of the direct current converting device being connected to the same current terminal of a capacitor in the electric circuit.

2. The digital input as claimed in claim 1, wherein a series circuit of a resistor and a diode is connected with the first output of the direct current converting device, and another diode is connected with the second output of the direct current converting device.

3. The digital input as claimed in claim 1, wherein an ohmic resistor is connected in the electric circuit in series with the capacitor and with a signal-current-carrying element provided at the electrical isolating point.

4. The digital input as claimed in claim 1, wherein a filter is connected between the two first current terminals and the input of the direct current converting device for filtering electrical and electromagnetic noise levels coupled into the external voltage source.

5. The digital input as claimed in claim 4, wherein a fusible link is connected between the filter and one of the two first current terminals.

6. The digital input as claimed in claim 4, wherein a second filter is connected to the two second current terminals for filtering electrical and electromagnetic noise levels coupled into a signal current line via the auxiliary contact.

7. A digital input to a device for recording a malfunction of a network operating process having at least one switching device, said digital input comprising:

a housing connected to a chassis potential;

two first input terminals provided on said housing and being connected to an external voltage source for supplying direct current;

two second input terminals provided on said housing and being connected to auxiliary contacts of said at least one switching device;

a device for converting the direct current from said external voltage source into a direct current which is electrically isolated from said external voltage source, said direct current converting device comprising two inputs which are coupled to said two first input terminals; and a signal circuit comprising an opto-coupler and a capacitor, in which a first input of the opto-coupler and a first terminal of the capacitor are connected to a first output of said direct current converting device, a second input of the opto-coupler is coupled to a first of said two second input terminals, and a second terminal of the capacitor is coupled to a second of said two second input terminals and to second and third outputs of said direct current converting device.

8. The digital input as claimed in claim 7, wherein said second and said third outputs of said direct current converting device output an input-side proportional direct current which is proportional to said external voltage source, and a direct current voltage having a constant amplitude, respectively.

9. The digital input as claimed in claim 8, wherein said second terminal of said capacitor is coupled via a series circuit of a high-resistance ohmic resistor and a diode to the third output of said direct current converting device.

10. The digital input as claimed in claim 9, wherein said second input of said opto-coupler is coupled via an ohmic resistor to said first of said two second input terminals.

11. The digital input as claimed in claim 10, wherein the signal circuit includes a filter between the ohmic resistor and said first of said two second input terminals.

12. The digital input as claimed in claim 7, wherein the inputs of said direct current converting device are coupled via a filter to said two first input terminals.

13. The digital input as claimed in claim 8, wherein the inputs of said direct current converting device are coupled via a filter to said two first input terminals.

14. The digital input as claimed in claim 9, wherein the inputs of said direct current converting device are coupled via a filter to said two first input terminals.

15. The digital input as claimed in claim 10, wherein the inputs of said direct current converting device are coupled via a filter to said two first input terminals.

16. The digital input as claimed in claim 11, wherein the inputs of said direct current converting device are coupled via an additional filter to said two first input terminals.

17. The digital input as claimed in claim 16, wherein a fusible link is connected between one of said two first input terminals and the additional filter.

* * * * *